UNITED STATES PATENT OFFICE.

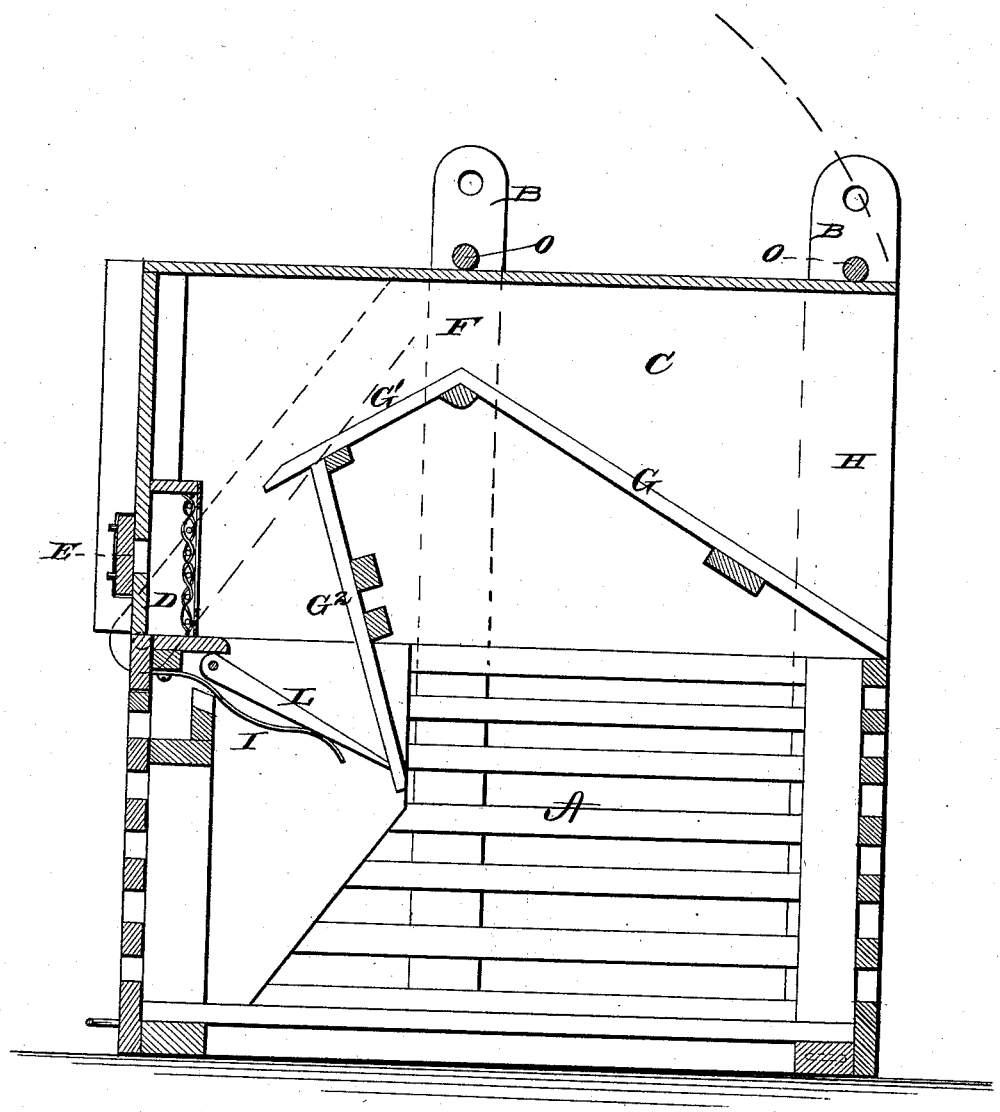

GENERAL DAVIS, OF SILVER RUN, ASSIGNOR TO S. G. JENKINS, OF TALLADEGA COUNTY, ALABAMA.

IMPROVEMENT IN FISH AND ANIMAL TRAPS.

Specification forming part of Letters Patent No. 201,504, dated March 19, 1878; application filed February 16, 1878.

*To all whom it may concern:*

Be it known that I, GENERAL DAVIS, of Silver Run, in the county of Talladega, and in the State of Alabama, have invented certain new and useful Improvements in Fish and Animal Traps; and do hereby declare that the following is a full, clear, and exact description thereof, reference being had to the accompanying drawings, and to the letters of reference marked thereon, making a part of this specification.

The nature of my invention consists in the construction and arrangement of a fish and animal trap, as will be hereinafter more fully set forth.

In order to enable others skilled in the art to which my invention appertains to make and use the same, I will now proceed to describe its construction and operation, referring to the annexed drawing, which represents a longitudinal vertical section of my trap.

A represents a coop or open cage of any suitable dimensions, open at the top, as shown, and provided at the sides with standards B B, the upper ends of which are perforated. At one end of the coop A is hinged a box, C, which closes and fits over the top of the coop between the standards B. This box is open at the bottom and at the end opposite the hinges.

In the hinged end of the box C is formed, on the inside, a bait-box, D, with sliding door E thereto in the end of the box. Within the box C is formed an archway, F, constructed by means of a series of slats, G, extending from the bottom of the entrance H inward and upward for a suitable distance. From the inner ends of these slats another series of slats, $G^1$, extend farther inward and downward to a point opposite the top of the bait-box D. A third series of slats, $G^2$, extend from below the slats $G^1$ downward at an angle into the coop A. At this end of the coop, below the bait-box, where the top box C is closed, are pivoted a series of fingers, L, which are held in an inclined position by means of springs I against the lower ends of the slats $G^2$.

The trap is to be secured by pins O O through the standards B B above the box C. The bait is then put in and the bait-box closed, and the trap submerged in the stream, and held in position, with the bait-box upstream, by any suitable means. The fish passing through the archway, and striving to obtain the bait in the box or basket D, will press on the spring-fingers L, and pass down into the coop, where they are thus secured. When desired, the trap is raised, the pins O O removed, and the box C thrown back on its hinges, when the contents of the coop can be easily secured.

This trap can be used on land for animals, if desired, in precisely the same manner.

Having thus fully described my invention, what I claim as new, and desire to secure by Letters Patent, is—

The within-described trap, consisting of the coop A, hinged box C, with opening H and bait-basket D, the series of slats G, $G^1$, and $G^2$, and the spring-fingers L, substantially as and for the purposes herein set forth.

In testimony that I claim the foregoing I have hereunto set my hand this 28th day of January, 1878.

GENERAL DAVIS.

Witnesses:
S. G. JENKINS,
H. E. HENDRICK.